United States Patent
Djebara et al.

(10) Patent No.: US 10,770,238 B2
(45) Date of Patent: Sep. 8, 2020

(54) SOLID ELECTROLYTIC CAPACITOR ASSEMBLY WITH HYDROPHOBIC COATINGS

(71) Applicant: AVX Corporation, Fountain Inn, SC (US)

(72) Inventors: Lotfi Djebara, Paris (FR); Martin Biler, Lanskroun (CZ); Frantisek Priban, Zabreh (CZ)

(73) Assignee: AVX Corporation, Fountain Inn, SC (US)

( * ) Notice: Subject to any disclaimer, the term of this patent is extended or adjusted under 35 U.S.C. 154(b) by 20 days.

(21) Appl. No.: 16/026,260

(22) Filed: Jul. 3, 2018

(65) Prior Publication Data

US 2019/0006117 A1 Jan. 3, 2019

Related U.S. Application Data

(60) Provisional application No. 62/528,248, filed on Jul. 3, 2017.

(51) Int. Cl.
*H01G 9/10* (2006.01)
*H01G 9/012* (2006.01)
(Continued)

(52) U.S. Cl.
CPC ............ *H01G 9/10* (2013.01); *H01G 9/0029* (2013.01); *H01G 9/012* (2013.01); *H01G 9/15* (2013.01); *H01G 9/052* (2013.01); *H01G 9/07* (2013.01)

(58) Field of Classification Search
CPC ............ H01G 9/10; H01G 9/15; H01G 9/012; H01G 9/052; H01G 9/07
See application file for complete search history.

(56) References Cited

U.S. PATENT DOCUMENTS 5,111,327 A   5/1992 Blohm et al.
5,135,297 A * 8/1992 Valint, Jr. ............. C08F 290/04
                                                351/159.73
(Continued)

FOREIGN PATENT DOCUMENTS

JP   H 0399423 U   10/1991
JP   H 1050554 A    2/1998
(Continued)

OTHER PUBLICATIONS

Gelest, "Silane Coupling Agents: Connecting Across Boundaries", 2006, 60 pages.
(Continued)

*Primary Examiner* — David M Sinclair
(74) *Attorney, Agent, or Firm* — Dority & Manning, P.A.

(57) ABSTRACT

A capacitor assembly that comprises a solid electrolytic capacitor element is provided. The capacitor assembly also comprises a casing material that encapsulates the capacitor element, an anode termination that is in electrical connection with the anode body and contains a portion that is positioned external to the casing material, and a cathode termination that is in electrical connection with the solid electrolyte and contains a portion that is positioned external to the casing material. A first hydrophobic coating is disposed in contact with the casing material and the external portion of the anode termination and a second hydrophobic coating is disposed in contact with the casing material and the external portion of the cathode termination.

24 Claims, 1 Drawing Sheet

(51) Int. Cl.
   H01G 9/15  (2006.01)
   H01G 9/00  (2006.01)
   H01G 9/07  (2006.01)
   H01G 9/052  (2006.01)

(56) References Cited

U.S. PATENT DOCUMENTS

| | | |
|---|---|---|
| 5,187,650 A | 2/1993 | Kudoh et al. |
| 5,424,907 A | 6/1995 | Kojima et al. |
| 5,457,862 A | 10/1995 | Sakata et al. |
| 5,473,503 A | 12/1995 | Sakata et al. |
| 5,729,428 A | 3/1998 | Sakata et al. |
| 5,812,367 A | 9/1998 | Kudoh et al. |
| 6,072,694 A | 6/2000 | Hahn et al. |
| 6,191,013 B1 | 2/2001 | Hahn et al. |
| 6,197,252 B1 | 3/2001 | Parks et al. |
| 6,229,688 B1 | 5/2001 | Kobayashi et al. |
| 6,426,866 B2 | 7/2002 | Shoji et al. |
| 6,519,135 B2 | 2/2003 | Sano et al. |
| 6,635,729 B1 | 10/2003 | Groenendaal et al. |
| 6,674,635 B1 | 1/2004 | Fife et al. |
| 6,733,545 B2 | 5/2004 | Shoji et al. |
| 6,798,645 B2 * | 9/2004 | Melody ............... H01G 9/012 361/538 |
| 6,845,004 B2 | 1/2005 | Melody et al. |
| 6,853,540 B2 | 2/2005 | Kudoh et al. |
| 6,987,663 B2 | 1/2006 | Merker et al. |
| 7,095,605 B2 | 8/2006 | Suenaga et al. |
| 7,180,728 B2 | 2/2007 | Kobayashi |
| 7,262,511 B2 | 8/2007 | Osako et al. |
| 7,283,350 B2 | 10/2007 | Katraro et al. |
| 7,350,281 B2 | 4/2008 | Schnetker |
| 7,377,947 B2 | 5/2008 | Merker et al. |
| 7,471,503 B2 | 12/2008 | Bruner et al. |
| 7,489,498 B2 | 2/2009 | Izu et al. |
| 7,515,394 B2 | 4/2009 | Nabeshima |
| 7,515,396 B2 | 4/2009 | Biler |
| 7,580,246 B2 | 8/2009 | Takagi et al. |
| 7,643,269 B2 | 1/2010 | Kirschbaum |
| 7,724,502 B2 | 5/2010 | Petrzilek et al. |
| 7,800,887 B2 | 9/2010 | Iida et al. |
| 7,903,392 B2 | 3/2011 | Yoshimitsu |
| 8,206,467 B2 | 6/2012 | Hayashi et al. |
| 8,228,664 B2 | 7/2012 | Yamaguchi et al. |
| 8,273,135 B2 | 9/2012 | Furukawa et al. |
| 8,310,816 B2 | 11/2012 | Chacko |
| 8,313,538 B2 | 11/2012 | Merker et al. |
| 8,379,372 B2 | 2/2013 | Zednicek et al. |
| 8,432,665 B2 | 4/2013 | Umemoto et al. |
| 8,437,117 B2 | 5/2013 | Umemoto et al. |
| 8,451,588 B2 | 5/2013 | Biler |
| 8,470,389 B2 | 6/2013 | Furukawa et al. |
| 8,480,762 B2 | 7/2013 | Yoshimitsu |
| 8,569,852 B2 | 10/2013 | Morise et al. |
| 8,576,543 B2 | 11/2013 | Biler et al. |
| 8,644,005 B2 | 2/2014 | Kosuge et al. |
| 8,691,327 B2 | 4/2014 | Furukawa et al. |
| 8,724,294 B2 | 5/2014 | Abe et al. |
| 8,747,607 B2 | 6/2014 | Huck et al. |
| 8,808,403 B2 | 8/2014 | Qiu et al. |
| 8,810,997 B2 | 8/2014 | Yamaguchi et al. |
| 8,885,326 B2 | 11/2014 | Yamanaka et al. |
| 8,947,857 B2 | 2/2015 | Biler et al. |
| 8,971,020 B2 | 3/2015 | Biler et al. |
| 9,030,807 B2 | 5/2015 | Chacko et al. |
| 9,142,356 B2 | 9/2015 | Furukawa et al. |
| 9,236,191 B2 | 1/2016 | Chacko et al. |
| 9,236,192 B2 | 1/2016 | Biler et al. |
| 9,236,193 B2 | 1/2016 | Tatsuno et al. |
| 9,293,263 B2 | 3/2016 | Liu et al. |
| 9,312,074 B2 | 4/2016 | Chacko et al. |
| 9,371,587 B2 | 6/2016 | Isogai |
| 9,406,445 B2 | 8/2016 | Petrzilek et al. |
| 9,502,183 B2 | 11/2016 | Saulter et al. |
| 9,555,418 B2 | 1/2017 | Soane et al. |
| 9,589,733 B2 | 3/2017 | Vilc et al. |
| 9,653,215 B2 | 5/2017 | Kosuge |
| 9,793,058 B2 | 10/2017 | Chacko et al. |
| 9,824,826 B2 | 11/2017 | Petrzilek et al. |
| 10,014,116 B2 | 7/2018 | Shi et al. |
| 10,128,054 B2 | 11/2018 | Chacko et al. |
| 10,186,382 B2 | 1/2019 | Uher et al. |
| 10,224,150 B2 | 3/2019 | Ning et al. |
| 2009/0040690 A1 | 2/2009 | Yasuda |
| 2009/0109603 A1 * | 4/2009 | Nobuta ............... H01G 9/0036 361/528 |
| 2011/0233450 A1 | 9/2011 | Nobuta et al. |
| 2013/0078366 A1 | 3/2013 | Abe |
| 2014/0211372 A1 * | 7/2014 | Sugawara ............ H01G 9/028 361/525 |
| 2015/0049419 A1 * | 2/2015 | Biler .................... H01G 9/025 361/525 |
| 2016/0104580 A1 | 4/2016 | Maeshima et al. |
| 2016/0225532 A1 | 8/2016 | Shi et al. |
| 2016/0329156 A1 | 11/2016 | Chacko et al. |
| 2018/0108478 A1 | 4/2018 | Petrzilek et al. |
| 2018/0108487 A1 | 4/2018 | Petrzilek et al. |
| 2018/0108489 A1 | 4/2018 | Nakata et al. |
| 2018/0254148 A1 * | 9/2018 | Lan ........................ H01G 9/08 |
| 2018/0254151 A1 | 9/2018 | Weaver et al. |
| 2019/0006116 A1 | 1/2019 | Petrzilek et al. |

FOREIGN PATENT DOCUMENTS

| | | |
|---|---|---|
| JP | 2000208367 A | 7/2000 |
| JP | 2012174948 A | 9/2012 |
| JP | 6293318 | 3/2018 |
| WO | WO 2008/102113 A2 | 8/2008 |
| WO | WO 2010/020753 A2 | 2/2010 |
| WO | WO 2011/104500 A1 | 9/2011 |
| WO | WO 2012/066273 A1 | 5/2012 |
| WO | WO 2013/132250 A1 | 9/2013 |
| WO | WO 2014/155099 A1 | 10/2014 |
| WO | WO 2016/102129 A1 | 6/2016 |
| WO | WO 2016/198856 A1 | 12/2016 |
| WO | WO 2016/198870 A1 | 12/2016 |

OTHER PUBLICATIONS

Material Safety Data Sheet for Dow Corning(R) JCR 6115 Clear A, Apr. 24, 2012, 7 pages.
Material Safety Data Sheet for Dow Corning(R) JCR 6115 Clear B, Dec. 22, 2008, 6 pages.
Product Information—SCS Labcoter® 2 (PDS 2010) from SCS Specialty Coating Systems™, 2009, 2 pages.
Article from Wacker Chemie AG (Genosil®) entitled "Silanes/Organofunctional for Powerful Connections," Sep. 2013, 20 pages.
International Search Report and Written Opinion for PCT/US2018/040682 dated Oct. 31, 2018, 10 pages.

* cited by examiner

SOLID ELECTROLYTIC CAPACITOR ASSEMBLY WITH HYDROPHOBIC COATINGS

CROSS REFERENCE TO RELATED APPLICATIONS

The present application claims filing benefit of U.S. Provisional Patent Application Ser. No. 62/528,248 having a filing date of Jul. 3, 2017, which is incorporated herein by reference in its entirety.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor element that includes a tantalum anode, dielectric layer, and conductive polymer solid electrolyte. In order to surface mount the capacitor element, the anode is connected to an anode termination and the solid electrolyte is connected to a cathode termination. Further, to help protect the capacitor from the exterior environment and provide it with good mechanical stability, the capacitor element is also encapsulated with a resinous casing material (e.g., epoxy resin) so that a portion of the anode and cathode terminations remain exposed for mounting to a surface. Unfortunately, it has been discovered that high temperatures that are often used during manufacture of the capacitor (e.g., reflow) can cause residual moisture to vaporize as steam, which may exit the case with considerable force and cause micro-cracks to form in the casing material or terminations. These micro-cracks can lead to a rapid deterioration of the electrical properties, particularly when the capacitor is exposed to high temperatures.

As such, a need exists for a solid electrolytic capacitor assembly that can exhibit improved properties at high temperatures.

SUMMARY OF THE INVENTION

In accordance with one embodiment of the present invention, a capacitor assembly is disclosed that comprises a solid electrolytic capacitor element that contains a sintered porous anode body, a dielectric that overlies the anode body, and a solid electrolyte that overlies the dielectric. The capacitor assembly also comprises a casing material that encapsulates the capacitor element, an anode termination that is in electrical connection with the anode body and contains a portion that is positioned external to the casing material, and a cathode termination that is in electrical connection with the solid electrolyte and contains a portion that is positioned external to the casing material. A first hydrophobic coating is disposed in contact with the casing material and the external portion of the anode termination and a second hydrophobic coating is disposed in contact with the casing material and the external portion of the cathode termination.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly that contains a capacitor element, which includes a sintered porous anode body, a dielectric overlying the anode body, and a solid electrolyte overlying the dielectric. The anode body is in electrical contact with an anode termination and the solid electrolyte is in electrical contact with a cathode termination. The capacitor element is also encapsulated with a casing material so that at least a portion of the anode and cathode terminations remain external to the casing material. Notably, a first hydrophobic coating is disposed in contact with the casing material and the external portion of the anode termination and a second hydrophobic coating is disposed in contact with the casing material and the external portion of the cathode termination. The hydrophobic coatings typically have a thickness of from about 50 nanometers to about 2 micrometers, in some embodiments from about 100 nanometers to about 1.5 micrometers, and in some embodiments, from about 250 nanometers to about 1 micrometer, as well as a relatively low dielectric constant, such as about 10 or less, in some embodiments about 5 or less, and in some embodiments, from about 2 to about 4, as determined at a frequency of 1 kHz and 30% relative humidity. Among other things, the present inventors have discovered that the hydrophobic coatings can help seal the casing material and those locations where it is in contact with the terminations. This helps limit micro-cracks that would otherwise form and helps limit its sensitivity to oxygen and moisture, which would otherwise form after exposure to high temperatures (e.g., during reflow), such as at a peak reflow temperature of from about 150° C. to about 350° C., and in some embodiments, from 200° C. to about 300° C. (e.g., 250° C.).

Consequently, the resulting capacitor may exhibit excellent electrical properties even when exposed to high temperatures. For example, the capacitor may be placed into contact with an atmosphere having a temperature of from about 70° C. or more, in some embodiments about 80° C. or more, and in some embodiments, from about 85° C. to about 225° C. (e.g., 85° C. or 125° C.). Even at such high temperatures, the capacitance may be about 30 nanoFarads per square centimeter ("$nF/cm^2$") or more, in some embodiments about 100 $nF/cm^2$ or more, in some embodiments from about 200 to about 30,000 $nF/cm^2$, and in some embodiments, from about 400 to about 20,000 $nF/cm^2$, determined at a frequency of 120 Hz. The capacitor may also exhibit a relatively low equivalent series resistance ("ESR"), such as about 500 mohms or less, in some embodiments less than about 250 mohms, and in some embodiments, from about 0.1 to about 200 mohms, determined at a frequency of 100 kHz. The dissipation factor of the capacitor may also be maintained at relatively low levels. The dissipation factor generally refers to losses that occur in the capacitor and is usually expressed as a percentage of the ideal capacitor performance. For example, the dissipation factor of the capacitor of the present invention is typically from about 1% to about 25%, in some embodiments from about 3% to about 10%, and in some embodiments, from about 5% to about 15%, as determined at a frequency of 120 Hz. Notably, these values (e.g., capacitance, ESR, and dissipation factor) can also remain stable at such temperatures for a substantial period of time, such as for about 100 hours or more, in some embodiments from about 300 hours to about 3000 hours, and in some embodiments, from about 400 hours to about 2500 hours (e.g., about 2,000 hours). In one embodiment, for example, the ratio of the capacitance value, ESR, and dissipation factor of the capacitor after being exposed to the hot atmosphere (e.g., 85° C.) and standard humidity levels (e.g., 25%) for about 2,000 hours to the respective capacitance value, ESR, and dissipation factor of the capacitor when initially exposed to the hot atmosphere may be from about 0.7 to 1.0, in some embodiments from about 0.75 to 1.0, and in some embodiments, from about 0.80 to 1.0.

Of course, the capacitor assembly is also not highly sensitive to moisture and can thus exhibit excellent electrical properties even when exposed to high humidity levels, such as when placed into contact with an atmosphere having a relative humidity of about 40% or more, in some embodiments about 45% or more, in some embodiments about 50% or more, and in some embodiments, about 60% or more (e.g., about 60% to about 85%). Relative humidity may, for instance, be determined in accordance with ASTM E337-02, Method A (2007). In one embodiment, for example, the ratio of the capacitance value, ESR, and dissipation factor of the capacitor after being exposed to the hot atmosphere (e.g., 85° C.) and high humidity (e.g., 85%) for 24 hours to the respective capacitance value, ESR, and dissipation factor of the capacitor when initially exposed to the hot atmosphere may be from about 0.7 to 1.0, in some embodiments from about 0.75 to 1.0, and in some embodiments, from about 0.80 to 1.0.

Various embodiments of the capacitor assembly will now be described in more detail.

I. Capacitor Element

A. Anode Body

The capacitor element includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluotantalate ($K_2TaF_7$), sodium fluotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 800,000 microFarads*Volts per gram ("µF*V/g") depending on the desired application. For instance, in certain embodiments, a high charge powder may be employed that has a specific charge of from about 100,000 to about 800,000 µF*V/g, in some embodiments from about 120,000 to about 700,000 µF*V/g, and in some embodiments, from about 150,000 to about 600,000 µF*V/g. In other embodiments, a low charge powder may be employed that has a specific charge of from about 2,000 to about 100,000 µF*V/g, in some embodiments from about 5,000 to about 80,000 µF*V/g, and in some embodiments, from about 10,000 to about 70,000 µF*V/g. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, micro-waxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1600° C., in some embodiments from about 800° C. to about 1500° C., and in some embodiments, from about 900° C. to about 1200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

As indicated above, a solid electrolyte overlies the dielectric and generally functions as the cathode for the capacitor assembly. The solid electrolyte may include materials as is known in the art, such as conductive polymers (e.g., polypyrroles, polythiophenes, polyanilines, etc.), manganese dioxide, and so forth. Typically, however, the solid electrolyte contains one or more layers containing extrinsically and/or intrinsically conductive polymer particles. One benefit of employing such particles is that they can minimize the presence of ionic species (e.g., $Fe^{2+}$ or $Fe^{3+}$) produced during conventional in situ polymerization processes, which can cause dielectric breakdown under high electric field due to ionic migration. Thus, by applying the conductive polymer as pre-polymerized particles rather through in situ polymerization, the resulting capacitor may exhibit a relatively high "breakdown voltage." If desired, the solid electrolyte may be formed from one or multiple layers. When multiple layers are employed, it is possible that one or more of the layers includes a conductive polymer formed by in situ polymerization. However, when it is desired to achieve very high breakdown voltages, the present inventors have discovered that the solid electrolyte is formed primarily from the conductive particles described above, and that it is generally free of conductive polymers formed via in situ polymerization. Regardless of the number of layers employed, the resulting solid electrolyte typically has a total a thickness of from about 1 micrometer (µm) to about 200 µm, in some embodiments from about 2 µm to about 50 µm, and in some embodiments, from about 5 µm to about 30 µm.

Thiophene polymers are particularly suitable for use in the solid electrolyte. In certain embodiments, for instance, an "extrinsically" conductive thiophene polymer may be employed in the solid electrolyte that has repeating units of the following formula (III):

wherein,

$R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (III) are generally considered to be "extrinsically" conductive to the extent that they typically require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. For example, one example of a suitable intrinsically conductive thiophene polymer may have repeating units of the following formula (IV):

(IV)

wherein,
R is $(CH_2)_a$—O—$(CH_2)_b$;
a is from 0 to 10, in some embodiments from 0 to 6, and in some embodiments, from 1 to 4 (e.g., 1);
b is from 1 to 18, in some embodiments from 1 to 10, and in some embodiments, from 2 to 6 (e.g., 2, 3, 4, or 5);
Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;
X is a cation, such as hydrogen, an alkali metal (e.g., lithium, sodium, rubidium, cesium or potassium), ammonium, etc.

In one particular embodiment, Z in formula (IV) is a sulfonate ion such that the intrinsically conductive polymer contains repeating units of the following formula (V):

(V)

wherein, R and X are defined above. In formula (IV) or (V), a is preferably 1 and b is preferably 3 or 4. Likewise, X is preferably sodium or potassium.

If desired, the polymer may be a copolymer that contains other types of repeating units. In such embodiments, the repeating units of formula (IV) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (IV). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-1-propanesulphonic acid, salt).

Regardless of the particular nature of the polymer, the resulting conductive polymer particles typically have an average size (e.g., diameter) of from about 1 to about 80 nanometers, in some embodiments from about 2 to about 70 nanometers, and in some embodiments, from about 3 to about 60 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Although not necessarily required, the conductive polymer particles may be applied in the form of a dispersion. The concentration of the conductive polymer in the dispersion may vary depending on the desired viscosity of the dispersion and the particular manner in which the dispersion is to be applied to the capacitor element. Typically, however, the polymer constitutes from about 0.1 to about 10 wt. %, in some embodiments from about 0.4 to about 5 wt. %, and in some embodiments, from about 0.5 to about 4 wt. % of the dispersion. The dispersion may also contain one or more components to enhance the overall properties of the resulting solid electrolyte. For example, the dispersion may contain a binder to further enhance the adhesive nature of the polymeric layer and also increase the stability of the particles within the dispersion. The binder may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or crosslinkable polymers, such as polyurethanes, polyacrylates or polyolefins, and subsequent crosslinking. Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropylt-rimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas.

i. Inner Layers

The solid electrolyte is generally formed from one or more "inner" conductive polymer layers. The term "inner" in this context refers to one or more layers that overly the dielectric, whether directly or via another layer (e.g., precoat layer). One or multiple inner layers may be employed. For example, the solid electrolyte typically contains from 2 to 30, in some embodiments from 4 to 20, and in some embodiments, from about 5 to 15 inner layers (e.g., 10 layers). The inner layer(s) may, for example, contain intrinsically and/or extrinsically conductive polymer particles such as described above. For instance, such particles may constitute about 50 wt. % or more, in some embodiments about 70 wt. % or more, and in some embodiments, about 90 wt. % or more (e.g., 100 wt. %) of the inner layer(s). In alternative embodiments, the inner layer(s) may contain an in-situ polymerized conductive polymer. In such embodiments, the in-situ polymerized polymers may constitute about 50 wt. % or more, in some embodiments about 70 wt. % or more, and in some embodiments, about 90 wt. % or more (e.g., 100 wt. %) of the inner layer(s).

ii. Outer Layers

The solid electrolyte may also contain one or more optional "outer" conductive polymer layers that overly the inner layer(s) and are formed from a different material. For example, the outer layer(s) may contain extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

D. External Polymer Coating

An external polymer coating may also overly the solid electrolyte. The external polymer coating generally contains one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

E. Cathode Coating

If desired, the capacitor element may also employ a cathode coating that overlies the solid electrolyte and other optional layers (e.g., external polymer coating). The cathode coating may contain a metal particle layer includes a plurality of conductive metal particles dispersed within a resinous polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the resinous polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The resinous polymer matrix typically includes a polymer, which may be thermoplastic or thermosetting in nature. Typically, however, the polymer is selected so that it can act as a barrier to electromigration of silver ions, and also so that it contains a relatively small amount of polar groups to minimize the degree of water adsorption in the cathode coating. In this regard, the present inventors have found that vinyl acetal polymers are particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous polymer matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

F. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte. In addition, a pre-coat layer may be employed in certain embodiments that overlies the dielectric and includes an organometallic compound (e.g., silane compound).

II. Terminations

Once the capacitor element is formed, the capacitor assembly may be provided with terminations. For example, the capacitor assembly may contain an anode termination to which an anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer. Such surface coating layers (e.g., tin) may be applied over an entire surface of the termination or, alternatively, only selectively applied at those locations that are external to the casing material and in contact therewith.

III. Casing Material

The capacitor element is also encapsulated with a casing material so that at least a portion of the anode and cathode terminations are exposed for mounting onto a circuit board. In certain embodiments, the casing material may contain an epoxy composition that contains one or more inorganic oxide fillers and a resinous material that includes one more epoxy resins optionally crosslinked with a co-reactant (hardener). To help improve the overall moisture resistance of the casing material, the content of the inorganic oxide fillers is maintained at a high level, such as about 75 wt. % or more, in some embodiments about 76 wt. % or more, and in some embodiments, from about 77 wt. % to about 90 wt. % of the composition. The nature of the inorganic oxide fillers may vary, such as silica, alumina, zirconia, magnesium oxides, iron oxides (e.g., iron hydroxide oxide yellow), titanium oxides (e.g., titanium dioxide), zinc oxides (e.g., boron zinc hydroxide oxide), copper oxides, zeolites, silicates, clays (e.g., smectite clay), etc., as well as composites (e.g., alumina-coated silica particles) and mixtures thereof. Regardless of the particular fillers employed, however, a substantial portion, if not all, of the inorganic oxide fillers is typically in the form of vitreous silica, which is believed to further improve the moisture resistance of the casing material due to its high purity and relatively simple chemical form. Vitreous silica may, for instance, constitute about 30 wt. % or more, in some embodiments from about 35 wt. % to about 90 wt. %, and in some embodiments, from about 40 wt. % to about 80 wt. % of the total weight of fillers employed in the composition, as well as from about 20 wt. % to about 70 wt. %, in some embodiments from about 25 wt. % to about 65 wt. %, and in some embodiments, from about 30 wt. % to about 60 wt. % of the entire composition. Of course, other forms of silica may also be employed in combination with the vitreous silica, such as quartz, fumed silica, cristabolite, etc.

The resinous material typically constitutes from about 0.5 wt. % to about 25 wt. %, in some embodiments from about 1 wt. % to about 24 wt. %, and in some embodiments, from about 10 wt. % to about 23 wt. % of the composition. Generally speaking, any of a variety of different types of epoxy resins may be employed in the present invention. Examples of suitable epoxy resins include, for instance, bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. To help provide the desired degree of moisture resistance, however, it is particularly desirable to employ epoxy phenol novolac ("EPN") resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. Specific examples of the novolac-type epoxy resins include a phenol-novolac epoxy resin, cresol-novolac epoxy resin, naphthol-novolac epoxy resin, naphthol-phenol co-condensation novolac epoxy resin, naphthol-cresol co-condensation novolac epoxy resin, brominated phenol-novolac epoxy resin, etc. Regardless of the type of resin selected, the resulting phenolic novolac epoxy resins typically have more than two oxirane groups and can be used to produce cured coating compositions with a high crosslinking density, which can be particularly suitable for enhancing moisture resistance. One such phenolic novolac epoxy resin is poly [(phenyl glycidyl ether)-co-formaldehyde]. Other suitable resins are commercially available under the trade designation ARALDITE (e.g., GY289, EPN 1183, EP 1179, EPN 1139, and EPN 1138) from Huntsman.

The epoxy resin may optionally be crosslinked with a co-reactant (hardener) to further improve the mechanical properties of the composition and also enhance its overall moisture resistance as noted above. Examples of such co-reactants may include, for instance, polyamides, amidoamines (e.g., aromatic amidoamines such as aminobenzam ides, aminobenzanilides, and aminobenzenesulfonam ides), aromatic diamines (e.g., diaminodiphenylmethane, diaminodiphenylsulfone, etc.), aminobenzoates (e.g., trimethylene glycol di-p-aminobenzoate and neopentyl glycol di-p-amino-benzoate), aliphatic amines (e.g., triethylenetetramine, isophoronediamine), cycloaliphatic amines (e.g., isophorone diamine), imidazole derivatives, guanidines (e.g., tetramethylguanidine), carboxylic acid anhydrides (e.g., methylhexahydrophthalic anhydride), carboxylic acid hydrazides (e.g., adipic acid hydrazide), phenolic-novolac resins (e.g., phenol novolac, cresol novolac, etc.), carboxylic acid amides, etc., as well as combinations thereof. Phenolic-novolac resins may be particularly suitable for use in the present invention.

Apart from the components noted above, it should be understood that still other additives may also be employed in the epoxy composition used to form the casing, such as photoinitiators, viscosity modifiers, suspension aiding agents, pigments, stress reducing agents, coupling agents (e.g., silane coupling agents), stabilizers, etc. When employed, such additives typically constitute from about 0.1 to about 20 wt. % of the total composition.

The particular manner in which the casing material is applied to the capacitor body may vary as desired. In one particular embodiment, the capacitor element is placed in a mold and the casing material is applied to the capacitor element so that it occupies the spaces defined by the mold and leaves exposed at least a portion of the anode and cathode terminations. The casing material may be initially provided in the form of a single or multiple compositions. For instance, a first composition may contain the epoxy resin and the second composition may contain the co-reactant. Regardless, once it is applied, the casing material may be heated or allowed to stand at ambient temperatures so that the epoxy resin is allowed to crosslink with the co-reactant, which thereby causes the epoxy composition to cure and harden into the desired shape of the case. For instance, the composition may be heated to a temperature of from about 15° C. to about 150° C., in some embodiments from about 20° C. to about 120° C., and in some embodiments, from about 25° C. to about 100° C.

Figure 1:
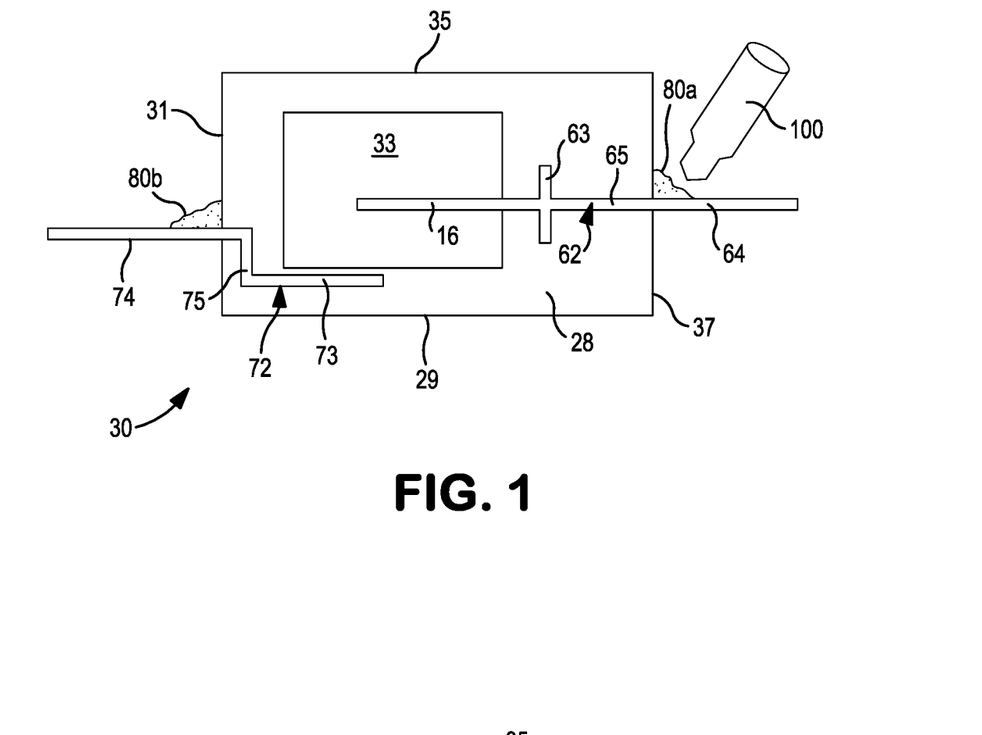
FIG. 1 is a schematic illustration of a technique for applying a hydrophobic coating between a casing material and terminations in accordance with one embodiment of the present invention.
Figure 2:
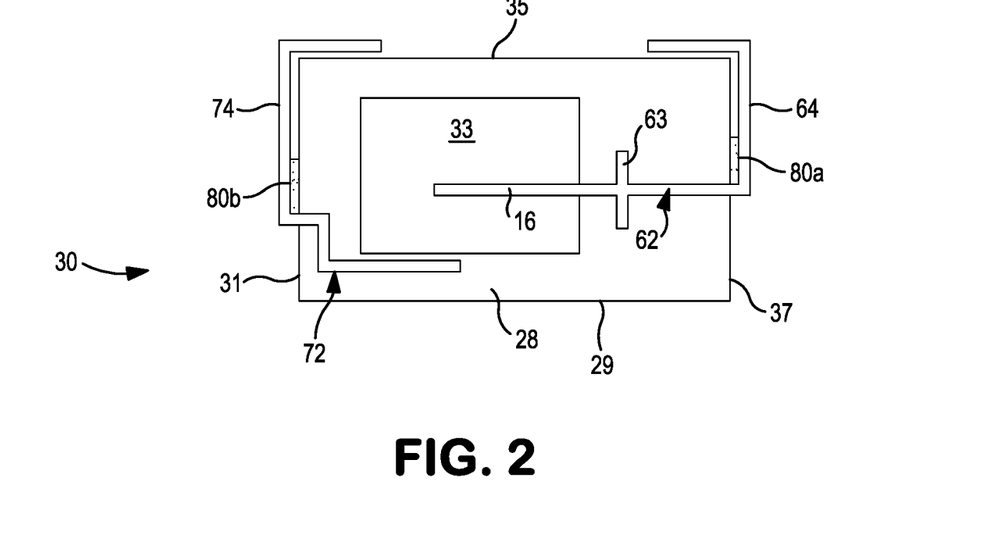
FIG. 2 is a schematic illustration of the capacitor of FIG. 1 after the terminations have been folded.

The resulting encapsulated capacitor assembly may have a variety of different configurations. Referring to FIGS. 1-2, one embodiment of a capacitor assembly 30 is shown that includes a casing material 28 having a top surface 35 and an opposing bottom surface 29, a front surface 37 and an opposing rear surface 31, and two opposing side surfaces (one of which is not shown). The casing material 28 encapsulates a capacitor element 33.

The capacitor assembly 30 also includes a cathode termination 72 that is provided in initial electrical contact with the solid electrolyte of the capacitor element 33. In this particular embodiment, the cathode termination 72 contains a first component 73 that is in electrical contact and generally parallel with the lower surface of the capacitor element 33. The cathode termination 72 also contains a second component 75 that is substantially perpendicular to the first component 73 and in electrical contract with a rear surface of the capacitor element 33. Although by no means required, the first and second components 73 and 75 in the illustrated embodiment are contained within the interior of the capacitor assembly and encapsulated by the casing material 28. However, the cathode termination 72 also contains a third component 74 that extends outwardly from the casing material 28. The cathode termination 72 may be electrically connected to the capacitor element 33 using any technique known in the art, such as mechanical welding, laser welding, conductive adhesives, etc. For example, a conductive adhesive (not shown) may be provided between the first component 73 and a lower surface of the capacitor element 33 and/or between the second component 75 and a rear surface of the capacitor element 33. The conductive adhesive may then be cured. For example, a heat press may be used to apply heat and pressure to ensure that the electrolytic capacitor element 33 is adequately adhered to the cathode termination 72 by the adhesive.

The capacitor assembly 30 also contains an anode termination 62 that is provided in contact with the anode body of the capacitor element 33. More particularly, the anode termination 62 in this embodiment includes a first component 63 positioned substantially perpendicular to a second component 65. The first component 63 is in electrical contact with an anode lead 16 that extends from the anode body of the capacitor element 33. Although by no means required, the first and second components 63 and 65 in the illustrated embodiment are contained within the interior of the capacitor assembly and encapsulated by the casing material 28. However, the anode termination 62 also contains a third component 64 that extends outwardly from the casing material 28. The anode lead 16 may be electrically connected to the first component 63 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam.

IV. Hydrophobic Coatings

As indicated above, hydrophobic coatings are disposed in contact with the casing material and external portions of the terminations. More particularly, a first hydrophobic coating is in contact with an external portion of the anode termination and/or a second hydrophobic coating is in contact with an external portion of the cathode termination. The hydrophobic coatings may be formed from the same or different materials but are generally formed from a hydrophobic material that includes a low surface energy polymer, such as a fluoropolymer, silicone, polyvinylacetate, etc. Fluoropolymers, for instance, may contain a hydrocarbon backbone polymer (e.g., polyolefin) in which some or all of the hydrogen atoms are substituted with fluorine groups, such as fluoroalkyl groups (e.g., trifluoromethyl, trifluoroethyl, etc.). The backbone polymer may likewise be formed from ethylenically unsaturated monomers (e.g., olefins, olefinic acrylates, olefinic methacrylates, etc.). Suitable monomers may, for instance, have a carbon chain length of from 3 to 20 atoms, in some embodiments from 6 to 12 carbon atoms in length, and in some embodiments, from 8 to 10 carbon atoms in length. Particularly suitable fluoroalkyl-substituted monomers for use in the present invention are fluoroalkyl (meth)acrylates, such as perfluorohexyl (meth)acrylate, perfluoroheptyl (meth)acrylate, perfluorooctyl (meth)acrylate, perfluorononyl perfluorodecyl (meth)acrylate, perfluoroundecyl (meth)acrylate or perfluorododecyl (meth)acrylate, etc., as well as mixtures thereof. As used herein, the term "(meth)acrylic" includes both acrylate and methacrylate monomers. In another embodiment, a homo- and/or copolymer of polyvinylacetate may also be employed.

To help aid in application to the capacitor, the hydrophobic coatings may be initially provided in the form of a coating formulation that contains a low surface energy polymer (e.g., flouropolymer) in combination with an organic solvent, which is typically a liquid at room temperature. When employed, such solvents typically constitute from about 90 wt. % to about 99.9 wt. %, in some embodiments from about 92 wt. % to about 99.8 wt. %, and in some embodiments, from about 95 wt. % to about 99.5 wt. % of the formulation, while the low surface energy polymers may constitute from about 0.1 wt. % to about 10 wt. %, in some embodiments from about 0.2 wt. % to about 8 wt. %, and in some embodiments, from about 0.5 wt. % to about 5 wt. % of the solution. Particularly suitable solvents are fluorinated hydrocarbon solvents, such as hydrofluoroethers, fluorinated ketones, fluorinated olefins, etc. In one particular embodiment, for instance, the coating formulation may contain a hydrofluoroether having the following general structure:

$$(R^1\text{---}O)_x\text{---}R^2 \quad \text{(I)}$$

wherein:

x is 1 or 2;

one of $R^1$ and $R^2$ is a perfluoroaliphatic or perfluorocyclic group and the other is an aliphatic or a cyclic hydrocarbon group. For example, $R^1$ and/or $R^2$ may include substituted and nonsubstituted alkyl, aryl, and alkylaryl groups and their derivatives. Representative examples of suitable hydrofluoroethers include the following compounds: $C_5F_{11}OC_2H_5$, $C_3F_7OCH_3$, $C_4F_9OCH_3$, $C_4F_9OC_2H_5$, $C_3F_7OCF(CF_3)$  $CF_2OCH_3$, $C_4F_9OC_2F_4OC_2F_4OC_2H_5$, $C_4F_9O(CF_2)_3OCH_3$, $C_3F_7CF(OC_2H_5)CF(CF_3)_2$, $C_2F_5CF(OCH_3)CF(CF_3)_2$, $C_4F_9OC_2H_4OC_4F_9$, etc. Particularly suitable are ethyl nonafluoroisobutyl ether and ethyl nonafluorobutyl ether, both of which are represented by the structure, $C_4F_9OC_2H_5$. Yet other suitable solvents may include esters (e.g., butyl acetate, butyl propionate, etc.); ketones (e.g., methyl isobutyl ketone, methyl n-amyl ketone, methyl iso-amyl ketone, etc.); ether esters (e.g., methoxypropyl acetate, ethoxypropyl acetate, etc.); hydrocarbons (e.g., toluene, xylenes, etc.); and so forth.

A variety of methods may generally be employed to apply such a coating formulation to the capacitor assembly. Referring again to FIG. 1, for example, a coating formulation 80a may be initially provided in contact with the external portion 64 of the anode termination 62 via a dispenser 100. Similarly, a coating formulation 80b may be provided in contact with the external portion 74 of the cathode termination 62. The coating formulations are generally dispensed in a manner to ensure that they are also provided in close contact with the casing material. For example, the coating formulation 80a is in contact with the front surface 37 of the casing material 28 and the coating formulation 80b is in contact with the rear surface 31 of the casing material 28. In the illustrated embodiment, the coating formulations are provided only on one surface of the termination. It should be understood, however, that the coating formulations can be provided on multiple surfaces if so desired. To aid in the placement of the coating formulations, the dispenser 100 and/or the entire capacitor assembly 30 can be titled at an angle so that gravity can assist the flow of the formulations towards a surface of the casing material.

Once applied, the external portions 64 and 74 of the terminations can be folded so that the respective formulations are pressed against respective surfaces of the casing material 28. For example, the external portion 64 of the anode termination 62 may be positioned generally parallel to a surface (e.g., rear surface 31) of the casing material 28. In this manner, the coating formulation 80b can become sandwiched between the exposed portion 64 and the rear surface 31. Likewise, the external portion 74 of the cathode termination 72 may be positioned generally parallel to a surface (e.g., front surface 37) of the casing material 28. In this manner, the coating formulation 80a can become sandwiched between the exposed portion 74 and the front surface 37. Of course, when folded, the external portions of the terminations may also extend around the casing material onto another surface of the casing material (e.g., top surface 35). Before, during, and/or after the terminations are folded, the coating formulations may be dried and/or cured so that hydrophobic coatings are formed. In such a manner, any solvent present within the coating formulations can be removed.

The present invention may be better understood by reference to the following examples.

Test Procedures

Capacitance (CAP)

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C. In some cases, the "wet-to-dry" capacitance can be determined. The "dry capacitance" refers to the capacitance of the part before application of the solid electrolyte, graphite, and silver layers, while the "wet capacitance" refers to the capacitance of the part after formation of the dielectric, measured in 14% nitric acid in reference to 1 mF tantalum cathode with 10 volt DC bias and a 0.5 volt peak to peak sinusoidal signal after 30 seconds of electrolyte soaking.

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may 100 kHz and the temperature may be 23° C.±2° C.

Leakage Current (DCL)

Leakage current may be measured using a leakage test meter at a temperature of 23° C.±2° C. and at the rated voltage after a minimum of 60 seconds.

Temperature Storage Testing

Temperature storage testing may be conducted (24 parts) at a temperature of 125° C. and no applied voltage. Capacitance, ESR and leakage current can be recorded after a 2,000 hours at recovered samples and then compared to the initial measurement at 0 hours. The recovery time after the test conditions may be 30 minutes.

Example 1

70,000 pFV/g tantalum powder was used to form anode samples. Each anode sample was embedded with a tantalum wire, sintered at 1260° C., and pressed to a density of 7.1 g/cm$^3$. The resulting pellets had a size of 1.8×2.4×1.2 mm. The pellets were anodized to 14.0 volts in water/phosphoric acid electrolyte with a conductivity of 8.6 mS at a temperature of 85° C. to form the dielectric layer. The pellets were anodized again to 50 volts in a water/boric acid/disodium tetraborate with a conductivity of 2.0 mS at a temperature of 30° C. for 25 seconds to form a thicker oxide layer built up on the outside. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The anode was washed in methanol to remove reaction byproducts, anodized in a liquid electrolyte, and washed again in methanol. This process was repeated 13 times. The parts were then dipped into a graphite dispersion and dried. Finally, the parts were dipped into a silver dispersion and dried. Multiple parts (10000) of 150 μF/6.3V capacitors were made in this manner and encapsulated in a silica resin.

Example 2

Capacitors were formed in the manner described in Example 1, except that a hydrophobic coating (fluoroacrylate resinous material in a hydrofluoroether solvent) was employed after encapsulation in a silica resin. The coating was disposed on at least a portion of the anode termination and on at least a portion of the cathode termination in a manner similar to as shown in FIG. 1 (coating formulations 80a and 80b). Multiple parts (10000) of 150 μF/6.3V capacitors were formed.

Example 3

Capacitors were formed in the manner described in Example 1, except that a hydrophobic coating (poly(vinyl) acetate resinous material in a butylacetate solvent) was employed after encapsulation in a silica resin. The coating was disposed on at least a portion of the anode termination and on at least a portion of the cathode termination in a manner similar to as shown in FIG. 1 (coating formulations 80a and 80b). Multiple parts (10000) of 150 μF/6.3V capacitors were formed.

24 parts from Example 1, 2 and 3 were tested for electrical parameters over a time period of 2,000 hours using the temperature storage test described above. The results are set forth below in Table 1.

TABLE 1

Temperature Storage Testing

| | Time [h] | Open Circuits [%] |
|---|---|---|
| Example 1 | 0 | 0 |
| | 2,000 | 96 |
| Example 2 | 0 | 0 |
| | 2,000 | 29 |
| Example 3 | 0 | 0 |
| | 2,000 | 13 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   a solid electrolytic capacitor element that contains a sintered porous anode body, a dielectric that overlies the anode body, and a solid electrolyte that overlies the dielectric;
   a casing material that encapsulates the capacitor element, wherein the casing material has an outer surface that forms an outermost surface of the capacitor element;
   an anode termination that is in electrical connection with the anode body and contains a portion that is positioned external to the casing material, wherein a first hydrophobic coating is disposed in contact with the outer surface of the casing material and the external portion of the anode termination; and
   a cathode termination that is in electrical connection with the solid electrolyte and contains a portion that is positioned external to the casing material, wherein a second hydrophobic coating is disposed in contact with the outer surface of the casing material and the external portion of the cathode termination,
   wherein the first hydrophobic coating is separate from the second hydrophobic coating.

2. The capacitor assembly of claim 1, wherein the first hydrophobic coating, the second hydrophobic coating, or both have a thickness of from about 50 nanometers to about 2 micrometers.

3. The capacitor assembly of claim 1, wherein the first hydrophobic coating, the second hydrophobic coating, or both have a dielectric constant of about 10 or less as determined at a frequency of 1 kHz and 30% relative humidity.

4. The capacitor assembly of claim 1, wherein the first hydrophobic coating, the second hydrophobic coating, or both contain a fluoropolymer.

5. The capacitor assembly of claim 4, wherein the fluoropolymer is formed from a fluoroalkyl-substituted ethylenically unsaturated monomer.

6. The capacitor assembly of claim 4, wherein the fluoropolymer is formed from a fluoroalkyl (meth)acrylate.

7. The capacitor assembly of claim 1, wherein the first hydrophobic coating, the second hydrophobic coating, or both contain a polyvinylacetate.

8. The capacitor assembly of claim 1, wherein the casing material defines a top surface and opposing bottom surface, a rear surface and opposing front surface, and two opposing side surfaces.

9. The capacitor assembly of claim 8, wherein the exposed portion of the cathode termination that is in contact with the second hydrophobic coating is positioned generally parallel with the rear surface.

10. The capacitor assembly of claim 1, wherein the first hydrophobic coating is disposed in contact with the front surface and the second hydrophobic coating is disposed in contact with the rear surface.

11. The capacitor assembly of claim 10, wherein the exposed portion of the anode termination that is in contact with the first hydrophobic coating is positioned generally parallel with the front surface.

12. The capacitor assembly of claim 1, wherein the capacitor element further comprises a cathode coating that contains a metal particle layer that overlies the solid electrolyte, wherein the metal particle layer includes a plurality of conductive metal particles dispersed within a resinous polymer matrix.

13. The capacitor assembly of claim 1, wherein the anode body includes tantalum and the dielectric includes tantalum pentoxide.

14. The capacitor assembly of claim 1, wherein the solid electrolyte includes a plurality of conductive polymer particles.

15. The capacitor assembly of claim 14, wherein the conductive polymer particles contain an extrinsically conductive polymer having repeating units of the following formula (III):

wherein,
   $R_7$ is a linear or branched, $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical, or a combination thereof; and
   q is an integer from 0 to 8.

16. The capacitor assembly of claim 14, wherein the extrinsically conductive polymer is poly(3,4-ethylenedioxythiophene).

17. The capacitor assembly of claim 14, wherein the particles also contain a polymeric counterion.

18. The capacitor assembly of claim 1, further comprising an external polymer coating that overlies the solid electrolyte and contains pre-polymerized conductive polymer particles.

19. A method for sealing a capacitor assembly that contains a solid electrolytic capacitor element that contains a sintered porous anode body, a dielectric that overlies the anode body, and a solid electrolyte that overlies the dielectric; a casing material that encapsulates the capacitor element wherein the casing material has an outer surface that forms an outermost surface of the capacitor element; an anode termination that is in electrical connection with the anode body and contains a portion that is positioned external to the casing material; and a cathode termination that is in electrical connection with the solid electrolyte and contains a portion that is positioned external to the casing material, the method comprising:

disposing a first hydrophobic coating formulation in contact with the external portion of the anode termination and the outer surface of the casing materiel and a second hydrophobic coating formulation in contact with the external portion of the cathode termination and the outer surface of the casing material; and     folding the external portion of the anode termination so that the first coating formulation is sandwiched between a surface of the casing material and the external portion of the anode termination; and     folding the external portion of the cathode termination so that the second coating formulation is sandwiched between a surface of the casing material and the external portion of the cathode termination,     wherein the first hydrophobic coating is separate from the second hydrophobic coating.

20. The method of claim 19, wherein the first coating formulation, the second coating formulation, or both contain a fluoropolymer and a solvent.

21. The method of claim 20, wherein the solvent includes a hydrofluoroether.

22. The method of claim 19, wherein the first coating formulation, the second coating formulation, or both contain a polyvinylacetate and a solvent.

23. The method of claim 20, wherein the solvent includes an ester.

24. The method of claim 19, further comprising drying or curing the first and second coating formulations to form first and second coatings, respectively.

\* \* \* \* \*